United States Patent [19]

Fraser et al.

[11] 4,073,309
[45] Feb. 14, 1978

[54] IRRIGATION APPARATUS

[75] Inventors: Arthur D. Fraser; Dwight A. Inglis, both of Walla Walla, Wash.

[73] Assignee: Raymond D. Harold, Walla Walla, Wash.

[21] Appl. No.: 723,500

[22] Filed: Sept. 15, 1976

[51] Int. Cl.² ............................................. B05B 3/02
[52] U.S. Cl. .................... 137/344; 239/177; 239/212; 335/153
[58] Field of Search .............. 137/344; 239/177, 212, 239/213; 324/34 PS, 34 D; 335/153

[56] References Cited

U.S. PATENT DOCUMENTS

| 3,785,400 | 1/1974 | Zimmerer et al. | 137/344 |
| 3,807,436 | 4/1974 | Pringle | 137/344 |
| 3,823,730 | 7/1974 | Sandstrom et al. | 137/344 |
| 3,952,769 | 4/1976 | Ott | 137/344 |

Primary Examiner—Alan Cohan
Assistant Examiner—Gerald A. Michalsky

Attorney, Agent, or Firm—Klarquist, Sparkman, Campbell, Leigh, Hall & Whinston

[57] ABSTRACT

Disclosed is a control system for maintaining the linear alignment of end-coupled, adjacent sections of self-propelled sprinkler irrigation apparatus, and for interrupting power to the drive means when any adjacent sections are in gross linear misalignment uncorrectable by the control system. A magnetic reed switch and permanent magnet combination, together with a metallic shield interposed between them, act as alignment sensors and overtravel sensors to open or close the reed switch in accordance with the alignment status of the irrigation system. A logic circuit utilizing an exclusive OR-gate is disclosed which causes the function of the alignment control sensors to reverse whenever the direction of the irrigation apparatus reverses, and, also, an electronic circuit utilizing a digital capacitance meter to indicate which tower is in gross linear misalignment, if any, should the apparatus automatically shut down.

17 Claims, 9 Drawing Figures

IRRIGATION APPARATUS

BACKGROUND OF THE INVENTION

The present invention relates generally to self-propelled sprinkler irrigation apparatus and more particularly to the type utilized for irrigating large sections of land. The invention relates specifically to an electronic control system for maintaining the linear alignment of the sprinkler irrigation apparatus and for shutting the apparatus down if the misalignment becomes too severe as to be uncorrectable by the control system.

The type of self-propelled sprinkler irrigation apparatus shown in the drawings is a type known in the art as a pivotal irrigation system consisting of a plurality of end-coupled adjacent irrigation pipes, all the sections extending radially outward from a pivot center for distances up to a quarter of a mile. Each of the sections is supported by a tower and each tower is driven by some type of drive means, causing the irrigation system to rotate around the center pivot point. As is apparent, the outer tower must travel farther than the tower adjacent to it, and so forth, moving inward towards the pivot of the irrigation apparatus. Typically the drive means on the separate towers consist of electric motors which are either on or off to keep said system moving in a predetermined direction.

It is necessary that the system be kept in linear alignment within acceptable limits, so that the irrigation pipe and its couplings are not damaged and so that the system will continue to rotate in an acceptable manner. In the past, this has been accomplished through alignment control systems consisting of photoelectric devices, microswitches, or permanent magnets and magnetic reed switches utilized as sensors to sense the linear misalignment of the system generating an electrical signal which is then utilized to drive the system back into linear alignment.

Photoelectric systems and microswitch systems tend to be expensive and/or unreliable. The known systems utilizing a permanent magnet and a reed switch require that the permanent magnet and the reed switch be selected so as to be compatible with each other and this makes it difficult to design a system whereby one is assured that when the permanent magnet is within a predetermined distance from the reed switch that the reed switch will close. That is to say, it is difficult, if not impossible, to design a system whereby sensing means utilized to sense the linear misalignment of the system is of a very exact nature. Alignment and adjustment of such known systems is tedious and difficult.

SUMMARY OF THE INVENTION

It is therefore the principal object of the present invention to provide a new and improved alignment and overtravel control system for maintaining the linear alignment of a self-propelled sprinkler irrigation apparatus.

It is another object of the present invention to provide an all-electronic control system such as hereinbefore described.

It is a further object of the present invention to provide an improved stalled tower locator circuit whereby the tower that is in excessive linear misalignment in said irrigation system is indicated to the operator of the system thereby facilitating its repair.

It is still another object of the present invention to provide an improved electronic means for controlling the irrigation apparatus' oscillations and movement by causing a delay to be interposed when the system begins movement and not causing said delay in the termination of movement.

In accordance with a proposed embodiment of the present invention, an alignment control system comprises a plurality of sensors mounted on movable towers of the irrigation apparatus, each sensor including permanent magnet means and magnetic switch means fixedly connected to a first section of irrigation apparatus, and magnetic shielding means fixedly connected to another and adjacent section of irrigation apparatus, in such a position as to magnetically shield or not shield the magnetic switch means in accordance with the alignment or misalignment of the irrigation apparatus sections. In the event of misalignment, circuitry is activated for moving the tower until realignment takes place.

In accordance with another aspect of the present invention, a plurality of sensors for detecting gross misalignment are disposed on a plurality of towers and connected in series. Should gross misalignment take place at one tower, the system will be shut down. Further circuitry enables the operator to detect the faulty tower.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
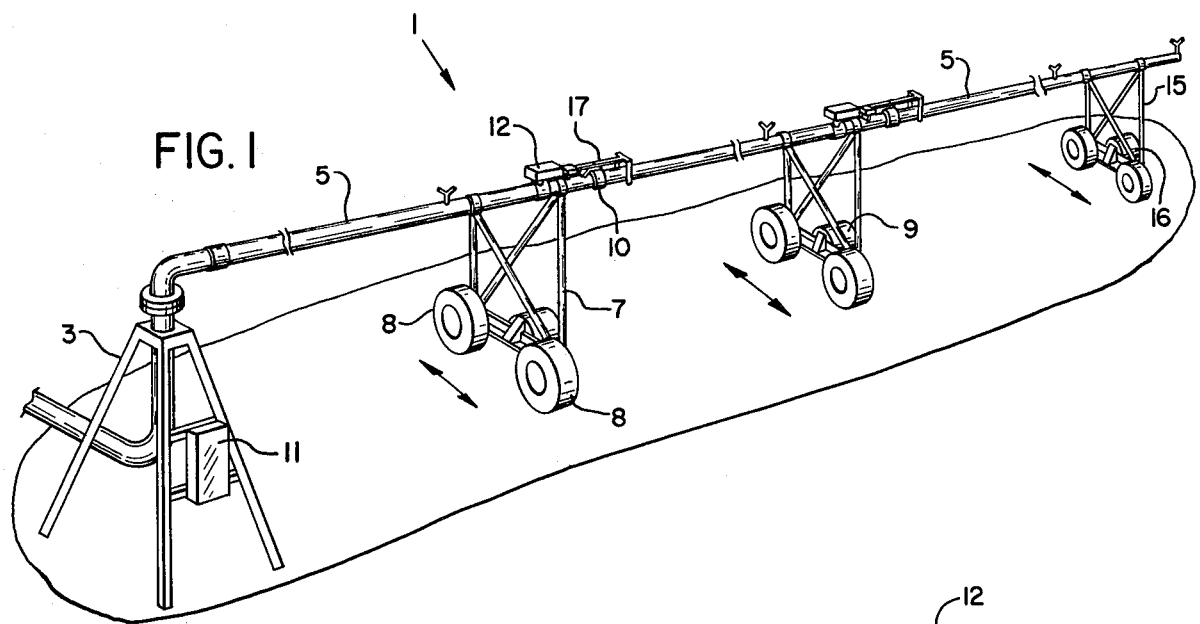
FIG. 1 is a perspective view of a self-propelled sprinkler irrigation apparatus.

Referring now to the drawings, and initially to FIG. 1, there is depicted an embodiment of a self-propelled sprinkler irrigation apparatus 1, particularly of the pivotal type, which utilizes the alignment and overtravel control system of the present invention. It is to be understood that the embodiment of the system shown in FIG. 1 is merely of a diagramatic nature, there being no attempt to show specific detailed construction, inasmuch as the apparatus which utilizes the invention is well known. In addition, it is to be further understood that the present invention is equally applicable to a linearly movable self-propelled sprinkler irrigation apparatus and is not limited in its application to only the pivotal type as shown in FIG. 1.

The self-propelled sprinkler irrigation apparatus 1 comprises a center pivot base 3, around which the system rotates in a selectable, predetermined manner. Pivotally connected to said base 3 are end-coupled sections of irrigation pipe 5, each section being supported by a tower 7 movable upon wheels 8, and being connected to another section by a flexible coupling 10. Drive motors 9 rotate said wheels 8 thereby causing said system to move in a selectable, predetermined manner in response to control signals from a master controller 11, which can be mounted on the center pivot base 3, and alignment controllers 12, there being one alignment controller rigidly mounted on each tower 7 with the exception of the outboard tower 15. Outboard drive motor 16 is energized by said master controller 11 only. Alignment control arms 17, responsive to relative movement of an immediately adjacent section of pipe, are slottedly received by said alignment controller 12 as hereinafter described.

Said apparatus can be caused to rotate either clockwise or counterclockwise and can be caused to automatically reverse direction or stop at a selectable, predetermined position, by the master controller 11. According to the invention as hereinafter described, the apparatus will be caused to remain in linear alignment automatically, unless impossible to do so, and, in that event, shut itself down and indicate which tower is stalled.

Figure 2:
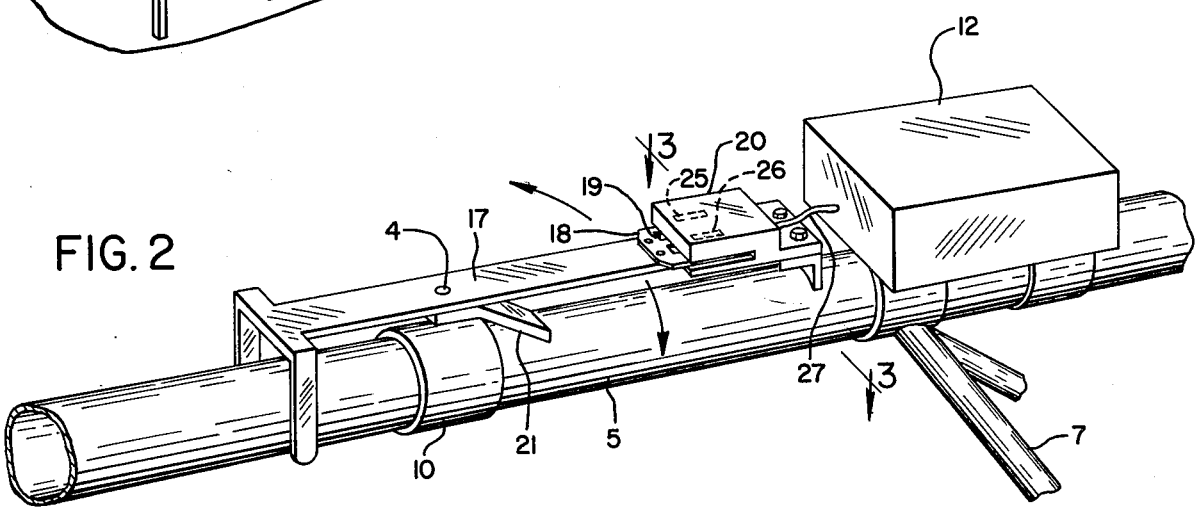
FIG. 2 is an enlarged perspective view of a portion of an alignment control system according to the present invention connected to two adjacent sections of a self-propelled sprinkler irrigation apparatus.
Figure 3:
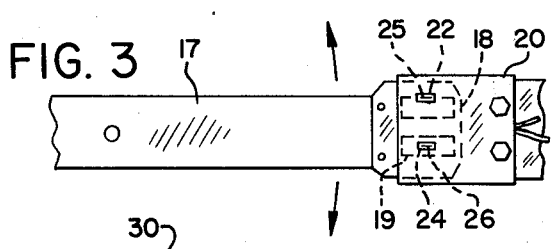
FIG. 3 is an enlarged, detailed, plan view of alignment and overtravel sensors according to the present invention connected to a self-propelled sprinkler irrigation apparatus which is in linear alignment, taken at 3—3 of FIG. 2.
Figure 4:
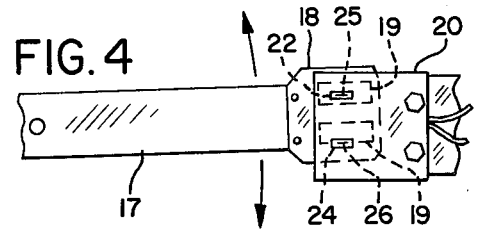
FIG. 4 is an enlarged, detailed plan view of alignment and overtravel sensors according to the present invention connected to a self-propelled sprinkler irrigation apparatus which is in linear misalignment, taken at 3—3 of FIG. 2.

FIGS. 2, 3 and 4 depict a portion of the invention consisting of a section of irrigation pipe 5 connected to a tower 7 and rigidly supporting an alignment controller 12. Rigidly connected to said pipe is a sensor housing 20 having an alignment control permanent magnet 22 and overtravel control permanent magnet 24 rigidly connected to one face of said sensor housing, and alignment control magnetic "reed" switch 25 and overtravel control magnetic "reed" switch 26 rigidly connected to the other and opposed face. An electrical cord 27 connects said alignment control magnetic switch 25 to its corresponding alignment controller 12 and said overtravel control magnetic switch 26 to the master controller 11. (FIG. 1).

Slottedly received in said sensor housing 20 is a shield 18 which can be of a metal of high magnetic permeability rigidly connected to an alignment control arm 17, such arm being pivotally connected at 4 to a support 21 which is rigidly connected to said section of irrigation pipe. The arm 17 brackets an adjacent section of irrigation pipe. Windows 19 in said shield are located such that when said irrigation apparatus is in linear alignment (FIG. 3), said overtravel control magnetic switch 26 is not magnetically shielded from said overtravel control permanent magnet 24, thereby causing said switch to be closed. In case of serious misalignment (FIG. 4), the switch 26 is shielded and its contacts will open. The windows 19 are located such that said overtravel control magnetic switch 26 is magnetically shielded from said overtravel control permanent magnet 24 only when said irrigation system is in such gross linear misalignment as to be uncorrectable by said alignment control system. That is, the window is wide enough to provide a range of operation for switch 26 before gross misalignment is detected by the switch being shielded. In addition, said windows 19 are located such that when said irrigation system is in linear misalignment correctable by said alignment control system, said alignment control magnetic switch 25 becomes either magnetically shielded or not shielded from said alignment control permanent magnet 22 depending on the direction of linear misalignment.

Let it be assumed that for the aligned condition (FIG. 3), switch 25 is magnetically shielded and therefore its contacts are open. Now let us assume the arm 17 has moved in a counter-clockwise direction because the more outboard section of pipe has moved in a counter-clockwise direction. Now, a window 19 will appear between switch 25 and magnet 22 whereby the contacts of switch 25 will close. Closure of the contacts of switch 25 results in the operation of drive motor 9 for the tower underneath the related alignment controller 12, causing movement of the adjacent inboard section of pipe until the condition of FIG. 3 once more obtains. The shielding and non-shielding produced by element 18 in this manner produces a relatively exact alignment condition. The drawing of FIG. 4 may be used to envision the non-aligned condition, above, wherein switch 25 is activated to close its contacts, even though FIG. 4 is primarily intended to show a more grossly misaligned condition.

Figure 5:
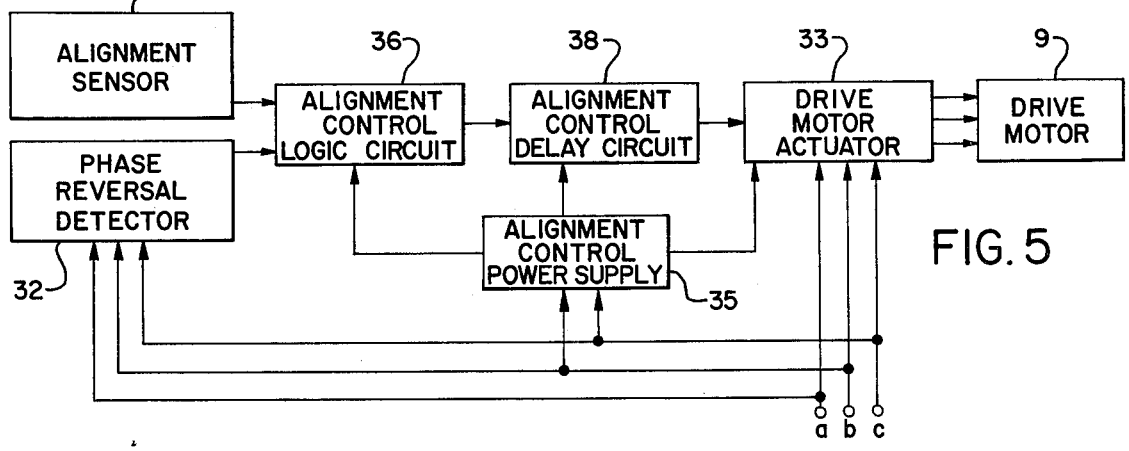
FIG. 5 is a block diagram of a portion of circuitry according to the present invention relating to alignment control.
Figure 6:
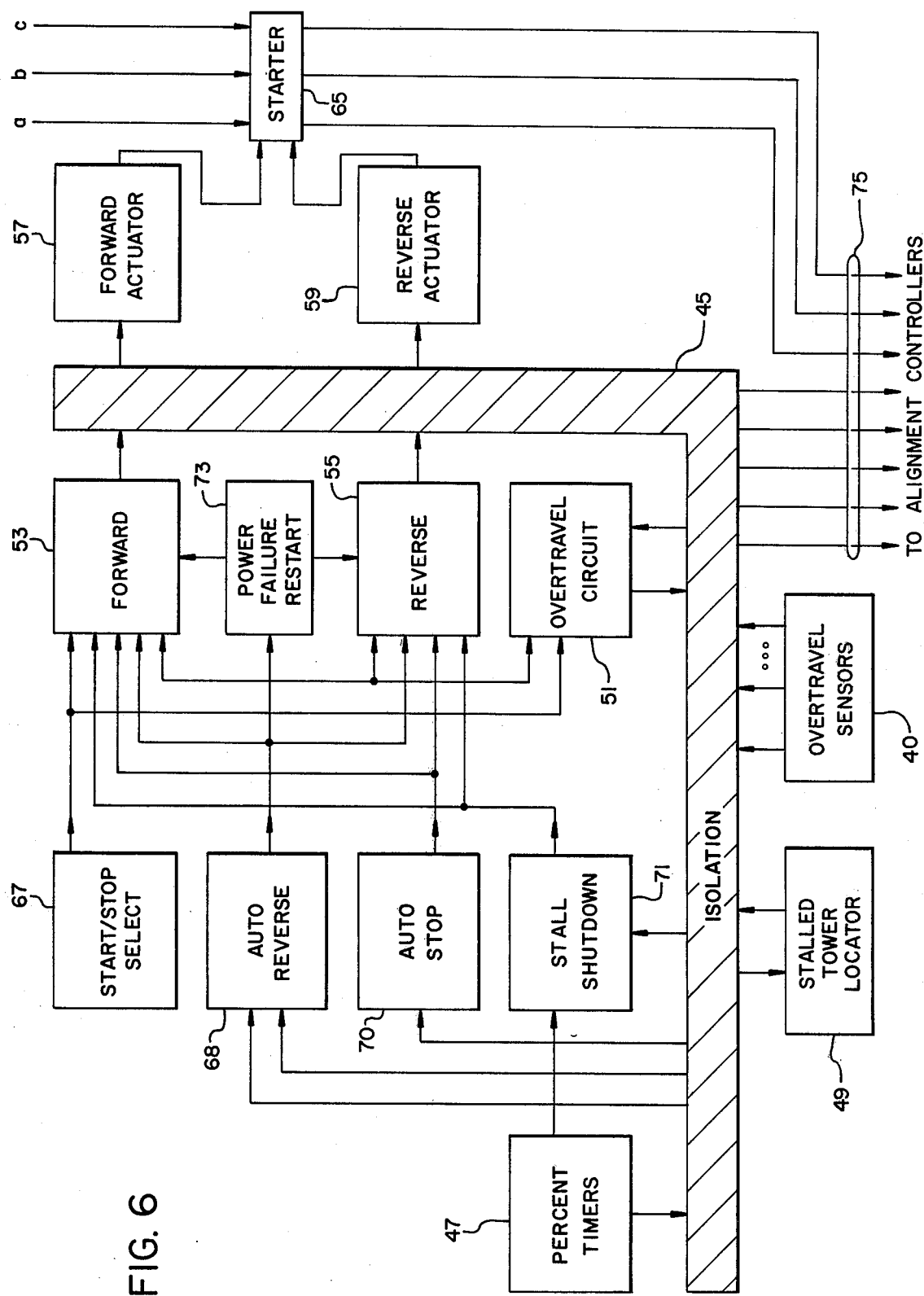
FIG. 6 is a block diagram of a portion of circuitry according to the present invention relating to overtravel and other control.

For clarity, the combination of the alignment control magnetic switch 25, the alignment control permanent magnet 22 and the shield 18 is referred to as the alignment sensor 30 (FIG. 5), and the combination of the overtravel control magnetic switch 26, the overtravel control permanent magnet 24 and the shield 18 is an overtravel sensor 40 (FIG. 6).

Referring now to FIG. 5, there is shown therein a block diagram of a preferred embodiment of the portion of the invention relating to alignment control wherein arrows represent electrical connections. It is to be understood that this block diagram depicts functionally that portion of my invention located in the alignment controller 12 (FIG. 1) with the exception of the alignment sensor 30 located as shown in FIG. 2 as hereinbefore defined. It is to be further understood that there is to be one said controller for each said alignment sensor 30. However, said alignment controller 12 need not be positioned as shown in FIG. 1, but can be located anywhere on the apparatus which is convenient and suitable.

A balanced set of three phase voltages $a$, $b$ and $c$ are connected to a phase reversal detector 32 which senses the relative phase relationship of the three phase voltages, and are also connected to a drive motor actuator which causes drive motor 9 to turn as hereinafter described. It is to be understood that the relative phase relationship of the three phase voltages determines the direction of rotation of said drive motor. An alignment control power supply 35 is energized by any two phases of the three said phase voltages, and supplies the necessary power to energize the electronic circuits utilized in this portion of the invention.

An alignment control logic circuit 36 senses the linear alignment of said irrigation apparatus through connection to the alignment sensor 30 and the relative phase relationship between the three phase voltages, a, b and c through connection to the phase reversal detector 32. If said irrigation apparatus is in linear misalignment, a voltage is generated and sent to an alignment control delay circuit 38 which delays, by an operably adjustable period of time, the energization of said drive motor actuator 33 and subsequent turning of said drive motor 9.

Referring now to FIG. 6, there is shown therein a block diagram of a preferred embodiment of that portion of the present invention relating to overtravel control wherein arrows represent electrical connections. It is to be understood that this block diagram depicts functionally the portion of the present invention located in said master controller 11 (FIG. 1) with the exception of the overtravel sensors 40 of which there is one said sensor associated with every alignment sensor 30 located as shown in FIG. 2 as hereinbefore defined. It is to be understood that there are a plurality of alignment controllers 12, there being one said sensor 30 for every said controller, whereas the plurality of overtravel sensors 40 are associated with one master controller 11 (FIGS. 1 and 2). It is to be further understood that the alignment control sensors 30 and the overtravel control sensors 40 need not be connected to the same sensor housing 20 or utilize the same shield 18, but may be separate devices, without departing from the spirit of the invention.

There is shown in FIG. 6 an isolation circuit 45 which electrically isolates the input circuits from the output circuits, thereby reducing electromagnetic interference or, in the parlance of the art, "noise." Inputting electrical signals into said circuit are a percent timer 47, which causes said outboard drive motor 16 to turn an operably adjustable percentage of the time (FIG. 1); said overtravel control sensors 40; and a stalled tower locator 49 which operably indicates which tower 7 (FIG. 1), if any, of said irrigation apparatus is in gross linear misalignment uncorrectable by said alignment and overtravel control system. Additional circuits comprise an overtravel circuit 51 which causes said irrigation apparatus to be shut down when the same is in gross linear misalignment and forward 53 and reverse 55 circuits to cause forward actuator 57 or reverse actuator 59 to operate. The actuators are connected to a starter 65 which determines the relative phase relationship of the balanced set of three phase voltages a, b and c, thereby determining the direction of rotation of said irrigation apparatus.

The master controller also comprises a start/stop circuit 67 to initiate or terminate operation of the alignment and overtravel control system; an auto-reverse circuit 68 which may cause the irrigation apparatus to reverse direction of travel at any operable selectable position; an auto-stop circuit 70 which may cause said irrigation apparatus to stop at any operable selectable position; a stall shut down circuit 71 to cause the alignment and overtravel control system to shut down whenever a particular tower fails to move after an operably adjustable period of time has elapsed; and a power failure restart circuit 73 to restart the alignment and overtravel control system after a power failure. Not shown are well known power supplied to supply power to said electrical circuits.

Figure 7:
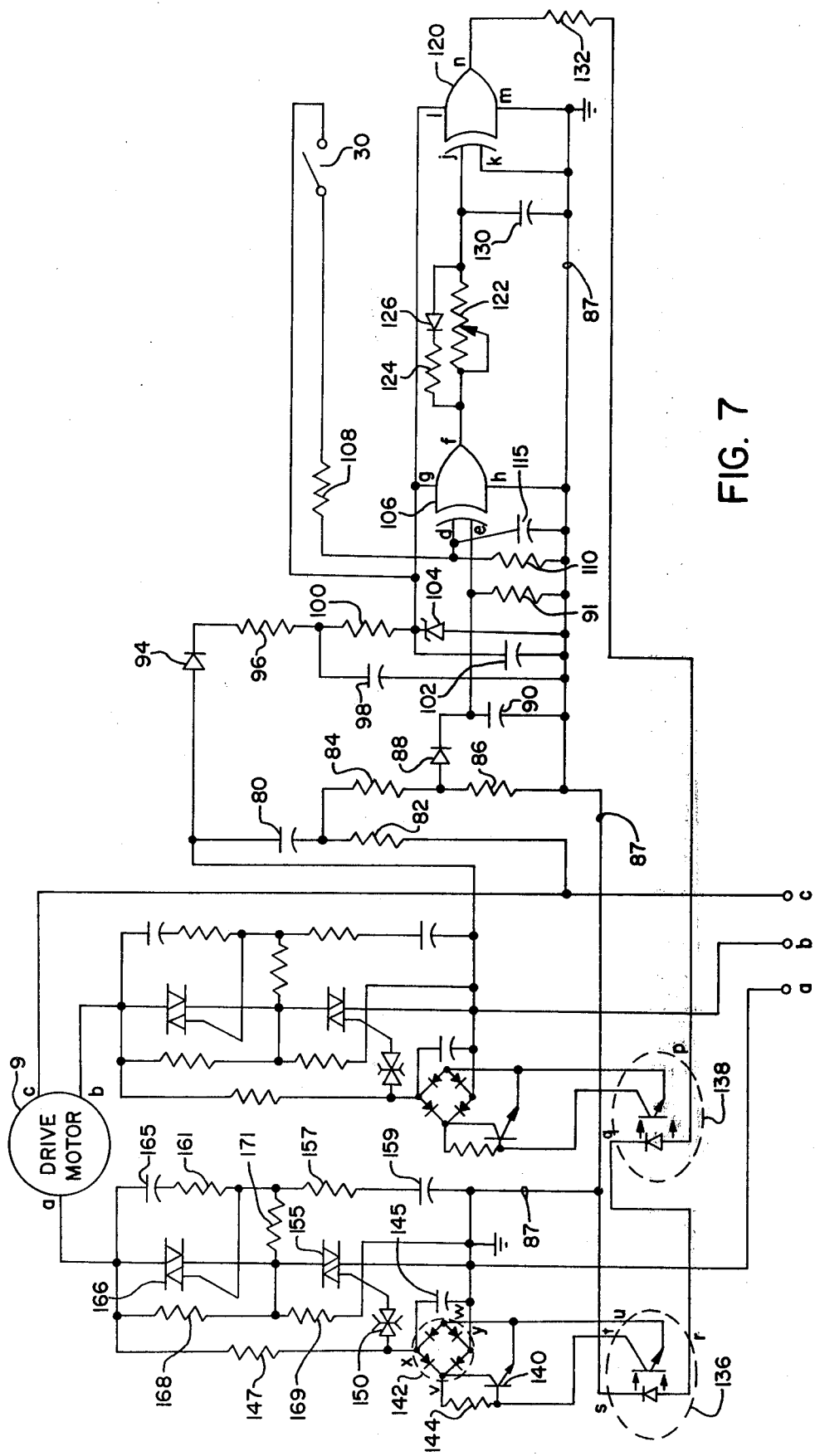
FIG. 7 is a schematic diagram for an alignment control portion of the present invention.

Referring now to FIG. 7 there is shown therein a preferred embodiment of that portion of the invention relating to alignment control. It is to be understood that FIG. 7 represents electrical circuitry contained within the alignment controllers 12 with the exception of the drive motor 9 and the alignment sensor 30, there being one such circuit for each said controller. The drive motor and alignment sensor are located as hereinbefore described. A balanced set of three phase voltages a, b and c are shown to supply the necessary electrical power to cause the drive motor 9 to turn in a predetermined direction, and also to supply necessary power to the electronics necessary to effectuate the tasks performed by said alignment control system shown in FIG. 7. A phase reversal detector 32 (FIG. 5) is shown in FIG. 7 to be a sensing capacitor 80 connected to voltage phase b, a phase resistor 82 connecting voltage phase c with said sensing capacitor, and associated phase resistor 84 connected to the sensing capacitor and phase resistor and connected through a measuring resistor 86 to voltage phase a. The ohmic values of the phase resistor, associated phase resistor and sensing capacitor, are chosen such that their reactance to a voltage of the frequency of the phase voltages a, b and c will be equal. Measuring resistor 86 is chosen to have a small impedance at said frequency in comparison to said other two resistors and capacitor. Between the associated phase resistor 84 and the measuring resistor 86 is connected a measuring diode 88 to which is connected a phase capacitor 90 whose other terminal is connected to the circuit common 87. The voltage from the phase capacitor to said circuit common forms the output voltage of said phase reversal detector, and it is a characteristic of this circuit that said output is a direct current voltage which is either of two values, one value being greater than the other, depending on the phase rotation. Since the motor rotation is dependent on phase rotation, the output of the circuit will indicate the direction which the irrigation apparatus is turning.

An alignment control power supply 35 (FIG. 5) is shown in FIG. 7 as a power supply diode 94 connected from phase b through a first power supply resistor 96 and a first power supply capacitor 98 to said circuit common 87. A second power supply resistor 100 in series with a second power supply capacitor 102 is similarly connected between the circuit common and the connection between the first power supply resistor and the first power supply capacitor. A Zener diode 104 is connected from the circuit common to the connection between the second power supply resistor and the second power supply capacitor causing the voltage at that point to remain at a stable level. It will be seen then that the output of the alignment control power supply 35 (FIG. 5) is a direct current voltage between circuit common and the Zener diode 104 and is utilized to supply the necessary direct current to the remainder of the electronics in this portion of the invention as hereinafter described.

An alignment control logic circuit 36 (FIG. 5) is shown in FIG. 7 to comprise a controlled inverter 106 in the form of an "exclusive-or gate" whose inputs are shown as d and e. It will be seen that input e is said output of said phase reversal detector 32 (FIG. 5) such output being the voltage across phase capacitor 90, while input d is shown to be a connection from the output of said alignment control power supply 35 (FIG. 5) through alignment control sensor 30, and through sensor resistor 108. A divider resistor 110 is connected from circuit common 87 to input d of controlled inverter 106, said divider resistor causing the voltage at input d to be at a predetermined level when the alignment control sensor 30 is in the closed position. Noise capacitor 115 is connected between circuit common 87 and said input *d* thereby reducing electromagnetic interference.

It will be seen that when the alignment control sensor 30 is closed the input at terminal *d* will be a positive voltage, while if the alignment control sensor is open the input voltage at terminal *d* will be zero or the same voltage as that of circuit common 87. It will further be seen that input *e*, such input being the voltage across phase capacitor 90, will be a particular voltage when phase voltages *a*, *b* and *c* are in one phase relationship, and will be another and different voltage when phase voltages *a*, *b* and *c* are in the opposite phase relationship. The output of said controlled inverter shown as output *f* will occur when only one of said inputs *d* or *e* is in the higher of their two possible states. Thus it will be seen that the output of said alignment control logic circuit, terminal *f*, will be made to depend upon the phase relationship between phase voltages *a*, *b* and *c* and the alignment or misalignment of said irrigation apparatus as evidenced by the status of alignment control sensor 30. Terminal *g* of said controlled inverter is connected to said alignment control power supply output and terminal *h* is connected to circuit common thereby delivering necessary electrical energy to said controlled inverter.

Let it be assumed that the phase rotation which produces counterclockwise rotation of the irrigation system will also result in a low voltage across capacitor 90. We will also assume the alignment condition of FIG. 3 whereby sensor 30 (representing switch 25) will be in the open condition. Thereafter, when a non-aligned condition arises due to counterclockwise movement of a more outboard section of pipe, sensor 30 will be closed, presenting an input at terminal *d* of inverter 106. This input will result in an output *f* which will cause rotation of the drive motor 9 and re-alignment of the pipe sections.

On the other hand, should clockwise rotation of the irrigation system be taking place, the phase of the power applied to the motor will have been reversed at the master controller. Now, the voltage across capacitor 90 will be sufficient to provide an input *e* to inverter 106. Under these circumstances, inverter 106 will produce an output *f* as long as sensor 30 is open and output *f* will cease when sensor 30 is closed to provide a matching input *d* at inverter 106 in accordance with the exclusive-or function. It will be seen, then, that the normal, "aligned" condition of the sensor will in this case be such that switch 25 in FIG. 3 is just operated, or just inside the edge of window 19 (FIG. 3). Then as the more outboard section of pipe moves in a clockwise direction, the switch contacts will open just as the edge of window 19 shields switch 25 from magnet 22. As a consequence, input *d* through inverter 106 will no longer be present, and in accordance with the exclusive-or function, the inverter produces an *f* output which will result in rotation of the drive motor 9 for reestablishing the condition of alignment. It will be seen that switch 25 in FIG. 3 is right under the edge of window 19, and there is not much rotational difference of control arm 17 as between a position which will close contacts 25 or open contacts 25. Causing the recognition of travel direction for the irrigation system to be dependent on phase sensing saves the provision of an additional control lead from controller 11 along the irrigation pipe.

An alignment control delay circuit 38 (FIG. 5) is shown in FIG. 7 as an or-gate 120 whose input *j* is connected through a parallel combination of adjustable resistor 122 and the series combination of delay resistor 124 (of smaller resistance) and delay diode 126 with the output terminal *f* of said controlled inverter 106. Delay capacitor 130 is connected from the input *j* to circuit common 87. The circuit comprising elements 122, 124, 126 and 130 comprises an integrating circuit whose time constant is dependent upon the branch of the circuit comprising elements 122, 124 and 126. It will be seen that said delay capacitor is caused to charge only through said adjustable resistor if there is an output from said alignment control logic circuit, but is allowed to discharge through the delay resistor and delay diode when there is no output of the alignment control logic circuit. Input *k* of said or-gate is connected directly to circuit common thereby being at zero voltage. Terminal 1 is connected to the output of the alignment control power supply and terminal *m* to circuit neutral, thereby supplying or-gate 120 with the necessary electrical power. It will be seen that the output of said or-gate being available at terminal *n*, will occur after an operably adjustable time when there is an output from said alignment control logic circuit, but that when the output from said alignment control logic circuit is terminated, the output at terminal *n* terminates essentially without delay.

As a consequence, oscillation or hunting of the system is avoided. However, overshoot is also avoided inasmuch as the system immediately stops when a misalignment condition is no longer present. Thus, the motors will rapidly stop when an alignment condition is achieved, but will not start up immediately for an exceptionally small degree of misalignment.

The output of said alignment control delay circuit at terminal *n* is connected through output resistor 132 to input terminal *p* of optical isolator 138 whose terminal *q* is connected to input *r* of optical isolator 136 whose terminal *s* is then connected to circuit common 87. It will be understood that the optical isolators 136 and 138 are of identical nature and are connected to two circuits which are of identical nature. Therefore, only one such circuit will be described, it being understood that optical isolator 138 operates in combination with an identical circuit and in an identical manner, but is associated with phase voltage *b* rather than phase voltage *a*.

An output from the alignment control delay circuit appearing at the terminal *n* of or-gate 120 will be seen to cause optical isolators 136 and 138 to be in the conduction mode. Terminal *t* of optical isolator 136 is connected to a base of transistor 140 and terminal *u* of said optical isolator is connected to the emitter of said transistor. The collector of transistor 140 is connected to terminal *v* of diode bridge 142, such terminal being connected through bias resistor 144 to said base of said transistor. Terminal *u* of the optical isolator 136 is connected to terminal *w* of the diode bridge, and terminals *x* and *y* of the diode bridge are connected to the terminals of capacitor 145. Terminal *y* of said diode bridge, is connected to circuit common 87.

It will be seen that when optical isolator 136 is in the conduction mode it will cause transistor 140 to be in the non-conduction mode, and, conversely, when optical isolator 136 is in the non-conduction mode it will be seen that transistor 140 is in the conduction mode. The combination of transistor 140, bias resistor 144 and diode bridge 142 are what can be referred to in the parlance of the art as a "clamp" circuit causing capacitor 145 to be charged only to a predetermined level and no higher when transistor 140 is in the conduction mode. When transistor 140 is in the non-conduction mode capacitor 145 is allowed to charge through resistor 147, such charging current being supplied via terminal a of drive motor 9. The charging level of capacitor 145 can be predetermined by choosing the values of said capacitor and said resistor 147. Said capacitor 145 is then said to be "unclamped", thereby charging to said predetermined voltage and providing an input via diac 150 from said capacitor 145 to the gate terminal of triac 155 thereby switching said triac to the conduction mode.

First triac resistor 157 and first triac capacitor 159, and second triac resistor 161 and second triac capacitor 165 form what are referred to in the art as "snubber" networks across said first triac and second triac 166 thereby providing latching and initial holding current for said triacs and causing first triac capacitor 159 to discharge through the gate of second triac 166 for turning it on whenever first triac 155 is in the conduction mode. Note the gate terminal of triac 166 is connected to the junction of resistors 157 and 161. Triac bias resistors 168 and 169 determine the operating point of the said triacs. Turnoff resistor 171 limits any transient current flowing through the gate of second triac 166 whenever said triacs are caused to turn off.

It will be seen that the motor actuator 33 (FIG. 5) as herein described causes said drive motor 9 to be energized through the hereinbefore described circuitry whenever optical isolators 136 and 138 are caused to conduct. This occurs whenever there is an output from the alignment control delay circuit 38 and the alignment control logic circuit 36. These outputs occur whenever said irrigation apparatus is in linear misalignment as evidenced by the status of the alignment sensor 30 (FIG. 5).

Figure 8:
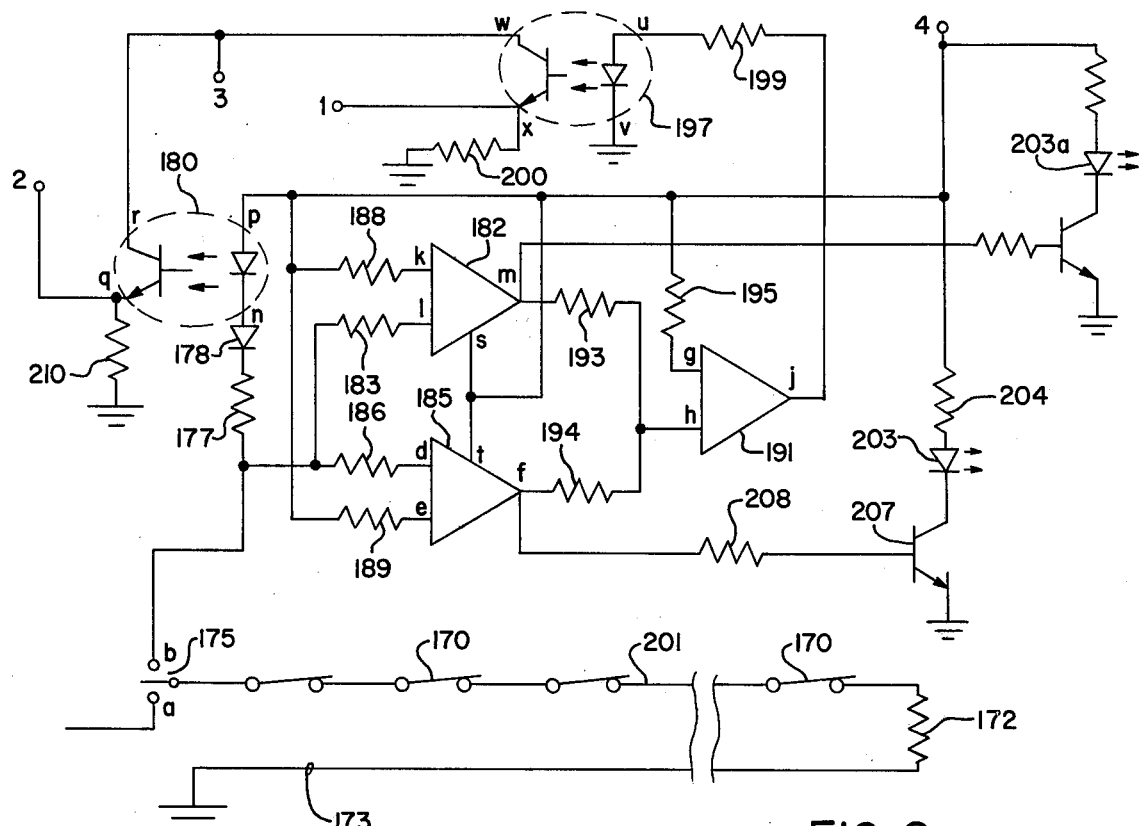
FIG. 8 is a schematic diagram for an overtravel control portion of the present invention.

Referring now to FIG. 8 there is shown therein a preferred embodiment of that portion of the invention relating to overtravel control of said irrigation apparatus. It is to be understood that the preferred embodiment shown in FIG. 8 is shown on a functional basis by overtravel circuit 51 and overtravel sensors 40 in FIG. 6. It will be seen that overtravel sensors 40 (FIG. 6) are shown in FIG. 8 as a plurality of overtravel switches 170, connected in series with one another, there being as many overtravel switches as there are alignment controllers 12 (FIG. 1) on the irrigation apparatus. It is to be understood that the overtravel switches 170 are a schematic representation of the overtravel magnetic switches 26 (FIGS. 2, 3 and 4). An overtravel load resistor 172 is connected between the last reed switch in series and circuit ground 173. It is to be understood that in FIG. 8 the overtravel switch farthest to the left is to represent said overtravel sensor nearest the center pivot base 3 in FIG. 1 while the overtravel switch furthest to the right in FIG. 8 is to represent that overtravel sensor nearest the outboard tower 15 of FIG. 1.

The most inboard overtravel sensor 170 is connected to an overtravel function switch 175 which is shown to have 2 positions, a and b. Position a completes a circuit between the overtravel sensors and the electronic circuitry shown in FIG. 9 and to be described hereinafter. Position b of the overtravel function switch 175 completes a circuit from said overtravel sensors through overtravel dividing resistor 177, overtravel diode 178 and optical isolator 180 to terminal 4, such terminal being a suitable positive direct current voltage source supplied to that portion of the invention shown in FIG. 8 by any suitable power supply means.

Input 1 of upper comparator 182 is connected through upper input resistor 183 to terminal b of the overtravel switch, while input terminal d of lower comparator 185 is connected through lower input resistor 186 to terminal b of the overtravel switch. Reference terminal k of the upper comparator is connected through upper reference resistor 188 to terminal 4, while lower reference terminal e of lower comparator 185 is connected through lower reference resistor 189 to terminal 4. The electrical energy necessary to cause said comparators 182 and 185 to operate is supplied to the terminals s and t, respectively, by terminal 4.

The upper input resistor and upper reference resistor, and the lower input resistor and lower reference resistor may be chosen so as to cause upper comparator 182 to generate an output at its terminal m only when the voltage at terminal b of overtravel switch 175 reaches a predetermined level and, similarly, so that lower comparator 185 will only generate an output at its terminal f when the voltage at terminal b of overtravel switch 175 is less than another and different predetermined level. It is to be understood that the word "output" in this context refers to a certain voltage level at terminal m and/or terminal f and that no "output" corresponds to a different voltage level. It will be seen, then, that as long as the voltage at terminal b of overtravel switch 175 remains within the upper and lower voltage limits set by upper and lower comparators 182 and 185 there will be a no output state voltage occurring at terminals m and f of said comparators.

The output of said upper and lower comparators then form an input to terminal h of master comparator 191 through upper output resistor 193 and lower output resistor 194. The reference terminal g of the master comparator 191 is connected to terminal 4 through master comparator resistor 195. Upper output resistor 193, lower output resistor 194 and master comparator resistor 195 may be chosen such that an output voltage at terminal j of master comparator 191 will only occur when an output voltage occurs at terminal m of upper comparator 182 or at terminal f of lower comparator 185 or both. The output j of master comparator 191 is connected to terminal u of optical isolator 197 through resistor 199. Terminal v of said optical isolator is connected to circuit ground 173. The emitter of said optical isolator shown as terminal x in FIG. 8 is connected to circuit ground through emitter resistor 200 and is also connected to terminal l in FIG. 8. The collector of said optical isolator 197 shown as terminal w is connected to terminal 3 which provides a source of positive direct current voltage, for that portion of the invention herein described, from any well known power supply. It will be seen that when an output positive voltage appears at terminal j of master comparator 191, optical isolator 197 will be caused to be in a conductive mode thereby causing a positive voltage to appear on terminal l. It will be understood that this condition will occur only when the voltage at terminal b of overtravel switch 175 is within the upper and lower predetermined voltage limits as determined by upper comparator 182, lower comparator 185 and their associated components.

Thus it will be seen that if any one of the plurality of overtravel switches 170 becomes open indicating a gross misalignment of said irrigation apparatus (as illustrated, for example, in FIG. 4), the voltage at terminal b will become that voltage as appears at terminal 4 as supplied by a power supply which voltage is outside of said voltage limits set by the upper comparator and the lower comparator, thereby causing the voltage at terminal *l* to be zero. If the overtravel switches 170 are all in a closed position indicating the absence of gross misalignment of said irrigation apparatus, the voltage at terminal *b* of said overtravel switch will be within the upper and lower voltage limits whereby the voltage at terminal *l* will be positive voltage. Likewise, if a short circuit occurs anywhere across overtravel load resistor 172 indicating a short circuit between overtravel wire 201 and circuit ground 173, the voltage at terminal *b* of the overtravel switch will be zero and outside of the upper and lower voltage limits similarly causing the output at terminal *l* to drop to zero voltage as hereinbefore described.

It will be understood, therefore, that terminal *l* being in a positive voltage state indicates that the alignment or misalignment of said irrigation apparatus is within predetermined limits as is desired, and being in a lower or zero voltage state indicates that either a short circuit has occurred between overtravel wire 201 and circuit ground 173 of the said irrigation apparatus is in gross misalignment. This signal occurring at terminal *l* is utilized to cause the entire irrigation apparatus to be de-energized and stop, by any well known means such as a circuit breaker or the like.

Means for indicating which of the two hereinbefore mentioned conditions is present when said irrigation apparatus shuts down is shown as a light emitting diode 203 connected to supply resistor 204 and the collector of lower transistor 207. The base of the lower transistor is connected through lower base resistor 208 to the output terminal *f* of lower comparator 185. The emitter of the lower transistor is tied to said circuit ground. The other terminal of said lower supply resistor 204 is connected to the voltage source at terminal 4. It will be seen that when an output occurs at terminal *f* of lower compartment 185 light emitting diode 203 is caused to light. Similarly an identical circuit is connected to the output terminal *m* of upper comparator 182 causing a similarly connected light emitting diode 203a to light whenever an output occurs at said output terminal and is not described herein.

A safety feature is included in the invention causing said irrigation apparatus to be shut down in the hereinbefore described condition of gross misalignment even when upper comparator 182 or lower comparator 185 or both have malfunctioned, and is shown as optical isolator 180 whose terminal *q* is connected through safety resistor 210 to circuit ground and whose terminal *r* is connected to said supply voltage terminal 3. Terminal *q* of said optical isolator is connected to output terminal 2 and can be seen to be a positive voltage whenever current if flowing through overtravel dividing resistor 177 thereby indicating that overtravel switches 170 are in a closed position indicating that said irrigation apparatus is not in gross misalignment. Terminal 2 may be connected to operate a system circuit breaker when the voltage at terminal 2 drops.

Figure 9:
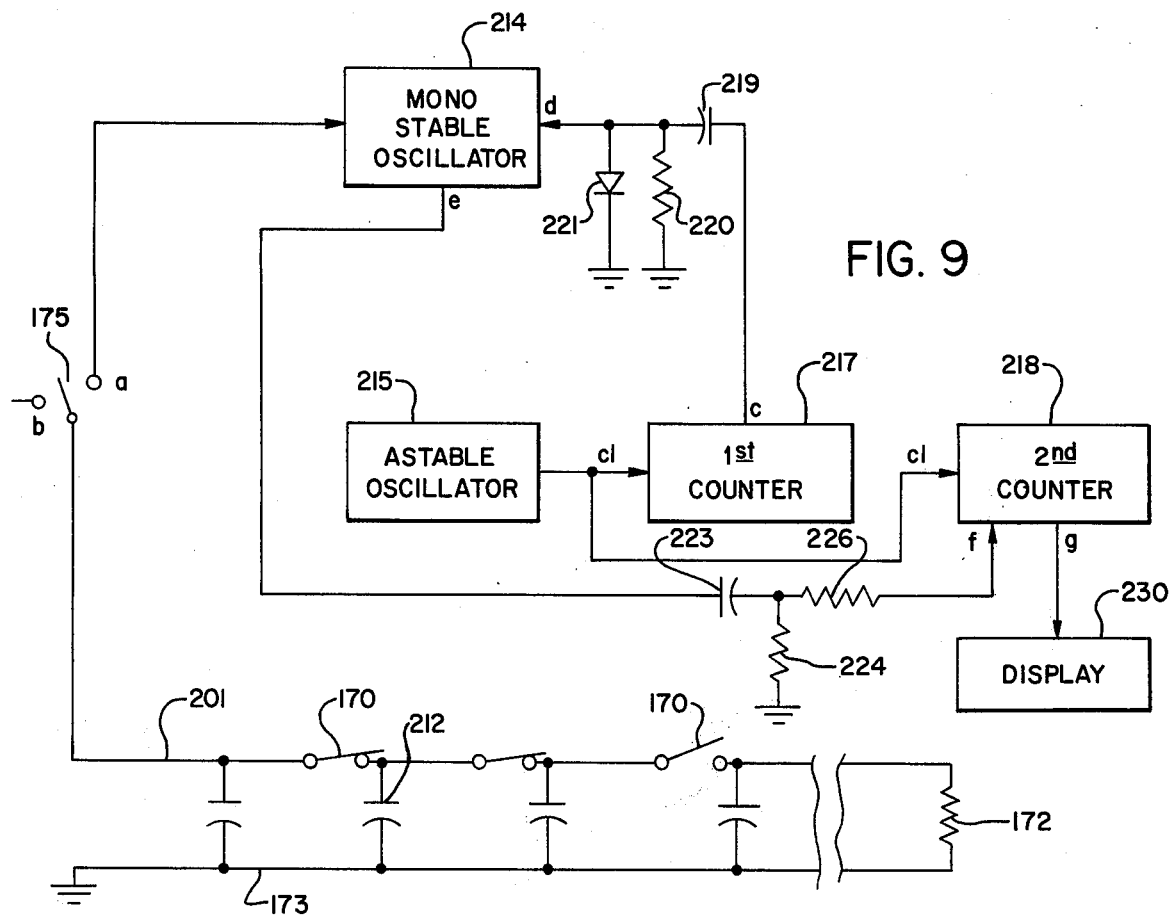
FIG. 9 is a schematic diagram for a stalled tower locator portion of the present invention.

Referring now to FIG. 9 there is shown a preferred embodiment of that portion of my invention indicated in functional form in FIG. 6 as stalled tower locator 49. It will be seen that FIG. 8 illustrates circuitry which is utilized according to the invention whenever overtravel control switch 175 is in the *b* position, and FIG. 9 shows circuitry utilized whenever said switch is in the *a* position. It will be seen therefore that overtravel switches 170 are connected in series with overtravel load resistor 172 as hereinbefore described. In addition, overtravel capacitors 212 are connected from overtravel wire 201 to circuit ground 173 there being one said capacitor for each said overtravel switch. The most inboard overtravel switch is then connected through overtravel function switch 175, if such is in the *a* position, to a monostable oscillator 214 of a well known type. An astable oscillator 215 is caused to generate electronic pulses at one millisecond intervals, such one millisecond pulses being inputed to first counter 217 and second counter 218, said inputs being referred to as "clock" inputs. First counter 217 through its output terminal *c* and through what is referred to as a "differentiator-clamp circuit" consisting of counter capacitor 219, counter resistor 220 and counter diode 221, generates a series of negative voltage pulses, such pulses being separated in time from each other by 0.512 seconds and being inputed to terminal *d* of monostable oscillator 214 thereby enabling this oscillator to generate an output for every inputed pulse. It is to be understood that the input pulses at terminal *d* of monostable oscillator 214 are referred to as "triggering" pulses.

It is to be understood that the output of monostable oscillator 214 appearing at terminal *e* is a positive pulse of electrical voltage whose duration or length is determined by the number of overtravel capacitors 212 which are suitably disposed in the time constant circuit of oscillator 214. The number of said overtravel capacitors being connected at any point in time as hereinbefore described depends upon whether or not overtravel switches 170 are in an open or closed position thereby indicating gross misalignment or an absence of gross linear misalignment of said irrigation apparatus. Overtravel capacitors 212 and monostable oscillator 214 and its associated components may be chosen such that output *e* consists of a pulse of such duration that for every said overtravel capacitor appearing from said overtravel wire 170 to said circuit ground 173, 1 millisecond of time appears in said pulse. Therefore if the third overtravel switch 170 were to be open thereby indicating that the third tower from the center pivot base 3 (see FIG. 1) was in gross misalignment, said output pulse from terminal *e* of monostable oscillator 214 would be a pulse of 3 millisecond duration.

Said output from monostable oscillator is then connected through oscillator capacitor 223, oscillator resistor 224 and feed resistor 226 to the input *f* of second counter 218. The oscillator capacitor 223, oscillator resistor 224 and feed resistor 226 form a differentiator. It is to be understood that the combination of said output pulse from monostable oscillator 214 and said differentiator may be chosen so as to cause second counter 218 to be reset to its zero state and to count for 3 milliseconds in the hereinbefore described example.

Output *g* of second counter 218 is then connected to a display 230 which can be of a known type such as a "seven segment read-out" caused to display a number "3" in the example hereinbefore described.

It is to be understood, then, that the number being displayed at display 230 corresponds to the tower which is in gross linear misalignment in said irrigation apparatus.

While we have shown and described a preferred embodiment of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. In self-propelled sprinkler irrigation apparatus, an alignment control system connected to said irrigation apparatus for controlling the linear alignment of said irrigation apparatus by causing sections of said irrigation apparatus to move or not move in a predetermined, automatic manner, comprising a misalignment sensor mechanically connected to said irrigation apparatus for sensing possible linear misalignments of said irrigation apparatus, correctable by said alignment control system, and for causing electrical circuits to be established or disestablished in response to the presence or absence of said possible misalignments, said misalignment sensor comprising:

permanent magnet means connected to a section of said irrigation apparatus for generating a field of magnetic flux, magnetic switch means, operable by said field of magnetic flux and also connected to said section of said irrigation apparatus and electrically connected to said electrical circuits, and magnetic shielding means connected to another and adjacent section of said irrigation apparatus in such position as to magnetically shield or not shield said magnetic switch means from said field of magnetic flux in a predetermined fashion thereby causing said magnetic switch means to establish or disestablish said electrical circuits in accordance with said presence or absence of misalignment of said irrigation apparatus.

2. The apparatus according to claim 1 wherein circuitry operated by said switching means includes a delay circuit responsive to an indication of misalignment for causing movement of the misaligned section of the irrigation apparatus after said misalignment has been detected for a predetermined time.

3. The apparatus according to claim 2 wherein said delay circuit is sensitive to realignment of the irrigation apparatus for bringing about immediate discontinuance of movement of the misaligned section when realignment has taken place.

4. The apparatus according to claim 3 wherein said delay circuit comprises an integrating circuit including a resistor and capacitor, said resistor being shunted by a circuit including a unidirectional conducting device which is operative to reduce the time constant of said circuit for the polarity of input when realignment has taken place.

5. The apparatus according to claim 1 further including a power phase rotation detection circuit, and logic means responsive to phase rotation and to operation of said magnetic switch means to bring about correct realignment dependent upon the direction of rotation of the irrigation apparatus.

6. The apparatus according to claim 1 wherein said magnetic shielding means comprises a plate of magnetic material and an aperture, the edge of which is normally aligned between said permanent magnet means and said magnetic switch means.

7. In self-propelled sprinkler irrigation apparatus, an alignment control system connected to said irrigation apparatus for causing sections of said irrigation apparatus to move or not to move in a predetermined, automatic manner, comprising an overtravel sensor, mechanically connected to said irrigation apparatus, for sensing possible linear misalignments of said irrigation apparatus uncorrectable by said alignment control system, and for causing electrical circuits to be established or disestablished in response to the presence or absence of said misalignments, said circuits causing said alignment control system to become de-energized and inoperative in response to the presence of said misalignments, said overtravel sensor comprising:

permanent magnet means connected to a section of said irrigation apparatus for generating a field of magnetic flux, magnetic switch means, operable by said field of magnetic flux, also connected to said section of said irrigation apparatus and electrically connected to said electrical circuits, and magnetic shielding means connected to another and adjacent section of said irrigation apparatus in such position as to shield or not shield said magnetic switch means from said field of magnetic flux in a predetermined fashion thereby causing said magnetic switch means to establish or disestablish said electrical circuits in accordance with said presence or absence of misalignment of said irrigation apparatus.

8. The apparatus according to claim 7 wherein said magnetic shielding means includes an aperture disposed between said permanent magnet means and said magnetic switch means, said magnetic shielding means being movable with said adjacent section or irrigation apparatus by an amount equalling at least the width of said aperture, the width of said aperture defining a range of alignment condition beyond which shielding of said switch means takes place to define gross misalignment in response to which said alignment control system is de-energized.

9. The apparatus according to claim 7 including a plurality of said control systems wherein said magnetic switch means are connected in series and including circuitry for detecting the opening of one of said magnetic switch means to de-energize said system.

10. The apparatus according to claim 9 including a resistor in series with said magnetic switch means, and including circuitry for applying a voltage to the series connection of said resistor and magnetic switch means and for detecting a voltage level over such series connection indicating closure of said magnetic switch means and for indicating either opening or shorting of said magnetic switch means for de-energizing said control system.

11. The apparatus according to claim 9 further including capacitive means between each said magnetic switch means and circuit common, a monostable oscillator having said magnetic switch means and capacitive means in the timing circuit thereof, and means to count the period of said oscillator for determining which of the magnetic switch means has opened whereby to identify the irrigation apparatus associated with the open magnetic switch means.

12. In self-propelled sprinkler irrigation apparatus, an alignment control system connected to said irrigation apparatus for controlling the linear alignment of said irrigation apparatus by causing sections of said irrigation apparatus to move or not move in a predetermined, automatic manner, comprising an electrical delay circuit for causing the initiation of said movement to be delayed in time by an operably adjustable amount, and for causing the termination of said movement to be substantially undelayed in time.

13. The apparatus according to claim 12 wherein said delay circuit includes an integrating circuit comprising a resistor and capacitor, and unidirectional connection means coupled across said resistor for changing the time constant of said integrating circuit for a given polarity of input applied thereto.

14. In self-propelled sprinkler irrigation apparatus, an alignment control system, connected to said irrigation apparatus for controlling the linear alignment of said irrigation apparatus, comprising:

a plurality of sensors, mechanically connected to said irrigation apparatus for sensing linear misalignments of said irrigation apparatus, correctable by said alignment control system, and for sensing other and gross linear misalignments of said irrigation apparatus, uncorrectable by said alignment control system, and for causing electrical circuits to be established or disestablished in response to said misalignments, each said sensor comprising:

an apertured metal sheet connected to a section of said irrigation apparatus, a slotted housing unit fixedly connected to another and adjacent section of said irrigation apparatus and allowing said metal sheet to be disposed in said slot, permanent magnet means fixedly connected to one face of said slotted housing unit for establishment of magnetic flux, and reed switch means fixedly connected to the opposite face of said slotted housing unit for causing electrical circuits to be established or disestablished according to whether or not said metal sheet is aligned within said slotted housing unit so as to magnetically shield said reed switches from said magnetic flux established by said permanent magnets, or not so to shield when apertures in said sheet are aligned with magnet means and reed switch means, said alignment corresponding to said irrigation apparatus being in linear alignment and misalignment corresponding to said irrigation apparatus being in linear misalignment, a plurality of sensors being mechanically connected to adjacent sections of said irrigation apparatus and electrically connected to one another in such manner as to cause the de-energization of said alignment control system if said irrigation apparatus is in gross linear misalignment.

15. The apparatus according to claim 14 further including a plurality of sensors mechanically connected to adjacent sections of said irrigation apparatus, each being responsive to misalignment for energizing movement of a section of irrigation apparatus to establish realignment.

16. In self-propelled sprinkler irrigation apparatus, an alignment control system connected to said irrigation apparatus comprising:

drive means for moving said irrigation apparatus, actuator means electrically connected to said drive means for energizing said drive means, control means electrically connected to said actuator means for controlling said actuator means, and sensors, electrically connected to said control means for sensing the alignment of said irrigation apparatus, each of said sensors comprising a magnet and magnetic switch means coupled to a first section of said irrigation apparatus and an apertured shield coupled to an adjacent section of said irrigation apparatus wherein an edge of the aperture in the shield is normally aligned between the magnet and the switch means, said control means being responsive to actuation and deactuation of said switch means causing said actuating means to energize a said drive means when a sensor indicates misalignment.

17. The combination of claim 16 wherein each said control means comprises:

a phase reversal detector for detecting the direction of movement of said irrigation apparatus by reversal of phase of electrical power applied thereto and for generating either of two different electrical signals in response to such detection, a logic circuit electrically connected to said phase reversal detector and an associated said sensor for generating or not generating an electrical signal in response to which of said electrical signals is received from said phase reversal detector and said switch means, and a delay circuit electrically connected to said logic circuit and electrically causing a delay in time of the commencement of movement of said irrigation apparatus to reestablish alignment.

* * * * *

UNITED STATES PATENT AND TRADEMARK OFFICE
CERTIFICATE OF CORRECTION

PATENT NO. : 4,073,309
DATED : February 14, 1978
INVENTOR(S) : ARTHUR D. FRASER ET AL It is certified that error appears in the above-identified patent and that said Letters Patent are hereby corrected as shown below:

Column 4, line 38, "is" should be --as--.
Column 5, line 63, "supplied" should be --supplies--.
Column 6, line 38, "b" should be italicized to conform with referenced alphabetical letters.
Column 11, line 23, "of" should be --or--.
Column 11, line 39, "compartment" should be --comparator--.
Column 11, line 67, "a" should be italicized to conform with referenced alphabetical letters.
Column 12, line 7, "a" first occurrence, should be italicized to conform with referenced alphabetical letters.
Column 14, line 29, claim 8, "or" should be --of--.

Signed and Sealed this

Twelfth Day of September 1978

[SEAL]

Attest:

RUTH C. MASON
*Attesting Officer*

DONALD W. BANNER
*Commissioner of Patents and Trademarks*